(12) United States Patent
Urch

(10) Patent No.: US 8,853,873 B2
(45) Date of Patent: Oct. 7, 2014

(54) POWER GENERATOR

(71) Applicant: Michael John Urch, Prestons (AU)

(72) Inventor: Michael John Urch, Prestons (AU)

(73) Assignee: Elemental Energy Technologies Ltd., Sydney, NSW (AU)

( * ) Notice: Subject to any disclaimer, the term of this patent is extended or adjusted under 35 U.S.C. 154(b) by 0 days.

(21) Appl. No.: 13/973,100

(22) Filed: Aug. 22, 2013

(65) Prior Publication Data

US 2013/0334822 A1    Dec. 19, 2013

Related U.S. Application Data

(63) Continuation of application No. 12/743,132, filed as application No. PCT/AU2008/001704 on Nov. 4, 2008, now abandoned.

(30) Foreign Application Priority Data

Nov. 16, 2007  (AU) ................................ 2007906277
Nov. 16, 2007  (AU) ................................ 2007906280
Aug. 6, 2008   (AU) ................................ 2008904025

(51) Int. Cl.
| | | |
|---|---|---|
| *F03B 13/00* | (2006.01) | |
| *F03B 13/10* | (2006.01) | |
| *H02P 9/04* | (2006.01) | |
| *F03D 1/04* | (2006.01) | |
| *F03D 1/06* | (2006.01) | |
| *F03B 17/06* | (2006.01) | |
| *F03B 11/02* | (2006.01) | |

(52) U.S. Cl.
CPC . *F03B 13/10* (2013.01); *F03D 1/04* (2013.01); *F03D 1/0633* (2013.01); *F05B 2250/25* (2013.01); *F03D 1/0625* (2013.01); *F05B 2240/14* (2013.01); *Y02E 10/28* (2013.01); *F05B 2240/133* (2013.01); *F03B 17/061* (2013.01); *F05B 2240/202* (2013.01); *F05B 2220/7066* (2013.01); *Y02E 10/726* (2013.01); *Y02E 10/725* (2013.01); *Y02E 10/721* (2013.01); *F05B 2210/16* (2013.01); *F03B 11/02* (2013.01)
USPC .......................................................... 290/43

(58) Field of Classification Search
CPC ........ F03B 13/10; F03B 17/061; F03B 11/02; F03D 1/04; F03D 1/0633; F03D 1/0625; Y02E 10/726; Y02E 10/28; Y02E 10/725; Y02E 10/721; F05B 2240/14; F05B 2240/202; F05B 2240/133; F05B 2250/25; F05B 2220/7066; F05B 2210/16
USPC .............................. 290/43, 42, 44, 53, 54, 55
See application file for complete search history.

(56) References Cited

U.S. PATENT DOCUMENTS

| | | | |
|---|---|---|---|
| 4,143,999 | A | 3/1979 | Ryall |
| 4,218,175 | A | 8/1980 | Carpenter |
| 4,258,271 | A | 3/1981 | Chappell et al. |
| 4,276,482 | A | 6/1981 | Crockett |
| 6,798,080 | B1 | 9/2004 | Baarman et al. |
| 2001/0009645 | A1 | 7/2001 | Noda |
| 2004/0027020 | A1 | 2/2004 | Newcomb |
| 2010/0320771 | A1 | 12/2010 | Urch |
| 2011/0115230 | A1* | 5/2011 | Urch ............................... 290/54 |

FOREIGN PATENT DOCUMENTS

| | | |
|---|---|---|
| DE | 19608369 A1 | 9/1997 |
| DE | 197 01 048 A1 | 7/1998 |
| DE | 10036307 A1 | 2/2002 |
| DE | 203 18 278 U1 | 4/2004 |
| GB | 1 464 762 | 2/1977 |
| JP | 11-299197 | 10/1999 |
| JP | 2003-214309 | 7/2003 |
| WO | WO 03/025385 A2 | 3/2003 |
| WO | WO 2006/059094 A1 | 6/2006 |
| WO | WO 2007/097659 A1 | 8/2007 |

OTHER PUBLICATIONS

Danish Patent and Trademark Office Singapore Search Report for Application No. 201003417-1, mailed Aug. 8, 2011, 8 pages.
Danish Patent and Trademark Office Singapore Written Opinion for Application No. 201003417-1, mailed Aug. 10, 2011, 11 pages.

International Search Report from Australian Patent Office for International Application No. PCT/AU2008/001704, mailed Feb. 3, 2009.
European Search Report, dated Dec. 2, 2013, for European Patent Application No. EP 88849879.

* cited by examiner

*Primary Examiner* — Javaid Nasri
(74) *Attorney, Agent, or Firm* — Finnegan, Henderson, Farabow, Garrett & Dunner, LLP

(57) ABSTRACT

An electrical power generator assembly (10a) for using kinetic energy from a flowing fluid (12) to generate electrical power. The electrical power generator (10a) includes a blade assembly (14) and at least one primary coil (52). The blade assembly (14) having a head end (16) for facing incoming flowing fluid (12), a tail end (18) spaced from the head end (16) for facing in the direction of the flowing fluid (12), and a rotational axis (20) extending between the head end (16) and the tail end (18). The blade assembly (14) includes a blade arrangement (44) which is arranged in generally helical fashion about the rotational axis (20), and at least one mounting formation (26, 36) connected to the blade arrangement (44). Each mounting formation (26, 36) is adapted to permit mounting of the blade assembly (14) for rotation about its rotational axis (20), so that in use fluid flowing past the electrical power generator assembly (10a) interacts with the blade arrangement (44) to rotate the blade assembly (14) about its rotational axis (20). The at least one primary coil (52) is connected to the blade arrangement (44) for rotation with the blade arrangement (44). The at least one primary coil (52) is energizable and being arranged in use to interact with at least one stationary secondary coil (54b) to generate electrical power in response to rotation of the blade assembly (14).

33 Claims, 9 Drawing Sheets

POWER GENERATOR

This is a continuation of U.S. patent application Ser. No. 12/743,132, filed Aug. 27, 2010, which is a national stage filing under 35 U.S.C. §371 of PCT/AU2008/001704, filed Nov. 14, 2008, and claims priority of AU 2008904025, filed Aug. 6, 2008, AU 2007906280, filed Nov. 16, 2007, AU 2007906277, filed Nov. 16, 2007, all of which are incorporated herein by reference.

TECHNICAL FIELD

The present invention relates generally to a power generator, and more particularly to an electrical power generator assembly for using kinetic energy from a flowing fluid to generate power.

The present invention relates also to an electrical power generator installation including such electrical power generator. The present invention is expected to be particularly advantageously, but not exclusively, used in the context of hydro-powered electricity generation.

BACKGROUND OF THE INVENTION

Kinetic energy in flowing fluids, such as water and wind, is a known alternative to energy sources such as bio-fuels and fossil fuels for generating power. Unlike, for example, bio- and fossil fuel which, when used in electrical power generation, go hand-in-hand with emission of harmful combustion gasses into the atmosphere, generation of power by using flowing fluids has no or very little adverse effects on the atmosphere. Although known installations for harvesting wind power generally have low running costs, they tend to be expensive to install and have relatively low generation capacity. Known installations for harvesting hydropower, for example tidal power, on the other hand, have relatively higher generation capacity. However, these types of installations too are expensive, require frequent maintenance, and could be unreliable due to problems associated with silting and corrosion.

OBJECT OF THE INVENTION

It is the object of the present invention to substantially overcome or at least ameliorate one or more of the above disadvantages, or at least to provide a useful alternative.

SUMMARY OF THE INVENTION

In one aspect, the present invention provides an electrical power generator assembly for using kinetic energy from a flowing fluid to generate electrical power, the electrical power generator including:

a blade assembly having a head end for facing incoming flowing fluid, a tail end spaced from the head end for facing in the direction of the flowing fluid, and a rotational axis extending between the head end and the tail end, the blade assembly including a blade arrangement which is arranged in generally helical fashion about the rotational axis, and at least one mounting formation connected to the blade arrangement, each mounting formation being adapted to permit mounting of the blade assembly for rotation about its rotational axis, so that in use fluid flowing past the electrical power generator assembly interacts with the blade arrangement to rotate the blade assembly about its rotational axis; and at least one primary coil connected to the blade arrangement for rotation with the blade arrangement, said at least one primary coil being energizable and being arranged in use to interact with at least one stationary secondary coil to generate electrical power in response to rotation of the blade assembly.

The electrical power generator preferably includes a plurality of primary coils, each primary coil being connected to one of the blades at or adjacent the tip of the blade.

In one form, the electrical power generator may also include a current supply electrically connected to each primary coil, for energizing each primary coil in order to induce a magnetic field around each primary coil. In another form, the electrical power generator may also include a current supply electrically connected to each secondary coil, for energizing each secondary coil in order to induce a magnetic field which induces a current in each primary coil.

Preferably, the electrical power generator yet further includes a said at least one stationary secondary coil, for magnetically communicating with each primary coil when each primary coil is energized. The electrical power generator, preferably, includes a plurality of said secondary coils.

In a second aspect, the present invention provides an electrical power generator assembly for using kinetic energy from a flowing fluid to generate electrical power, the electrical power generator including:

a blade assembly having a head end for facing incoming flowing fluid, a tail end spaced from the head end for facing in the direction of the flowing fluid, and a rotational axis extending between the head end and the tail end, the blade assembly including a blade arrangement which is arranged in generally helical fashion about the rotational axis, and at least one mounting formation connected to the blade arrangement, each mounting formation being adapted to permit mounting of the blade assembly for rotation about its rotational axis, so that in use fluid flowing past the electrical power generator assembly interacts with the blade arrangement to rotate the blade assembly about its rotational axis; and at least one permanent magnet connected to the blade arrangement for rotation with the blade arrangement, said at least one permanent magnet being arranged in use to interact with at least one stationary secondary coil to generate electrical power in response to rotation of the blade assembly.

The blade assembly preferably includes an elongated shaft extending between the head end and the tail end of the blade assembly, the shaft having a longitudinal axis defining the rotational axis of the blade assembly, and the blade arrangement being mounted on and radiating from the shaft. The generator is preferably drivingly connected to the shaft. The blade arrangement preferably terminates shy of the ends of the shaft, with each mounting formation being provided by an end portion of the shaft, so that in use, the shaft, and accordingly the blade assembly, is rotatably mounted or supported. Preferably, each mounting formation includes a bearing element mounted on the shaft and adapted to be connected to a support structure, to permit rotation of the blade assembly relative to said support structure.

In one embodiment, the blade arrangement preferably includes a plurality of beams which are longitudinally spaced in said generally helical fashion along the shaft. In this embodiment, each beam is preferably mounted on the shaft such that it is adjustably rotatable around the rotational axis of the shaft, to permit adjustment of the pitch of the blade assembly. The blade arrangement, in this embodiment, further preferably includes a web or skin extending along the lengths of and connected to each pair of adjacent beams, such that the blade arrangement, irrespective of the pitch of each beam, is uninterrupted across its surface.

In another embodiment, if desired, the blade arrangement preferably includes one or more continuous helical blades.

Preferably, the blade arrangement, when seen in side elevation, tapers from the head end thereof to its tail end.

The power generator assembly preferably also includes an elongated open-ended shroud extending between the head end and the tail end of the blade assembly, the shroud being connected to and surrounding the blade assembly, so that the shroud rotates with the blade assembly in use. The shroud too thus has a head end and a tail end. Preferably, the shroud is connected to the tip of each blade of the blade arrangement, the connection between the shroud and each blade being a substantially fluid impervious connection. Likewise, in the embodiment where the blade arrangement includes a plurality of beams and said webs or skins, a tip of each web or skin is, preferably, also connected to the shroud. Preferably, the connections between the webs or skins and the shroud are substantially fluid impervious connections. In use, flowing fluid interacting with the blade arrangement to rotate the power generator assembly thus enters the shroud from its head end and exits the shroud via its tail end.

Preferably, the shroud is of thin wall construction, and converges along at least part of its length from its head end to its tail end, said convergence corresponding to the tapering of the blade assembly.

The shroud, preferably, is of multi-section or unitary moulded construction, having a head end section via which a flowing fluid enters the shroud, a tail end section via which flowing fluid exits the shroud, and an elongated intermediate section extending between the head end section and the tail end section, with the intermediate section converging from the head end section towards the tail end section. Advantageously, the head end section of the shroud converges towards the intermediate section, and the tail end section diverges away from the intermediate section, such that the shroud is generally in the form of a converging-diverging venturi having a converging elongated throat defined by the intermediate section.

Preferably, the shroud has a circular cross-sectional profile, so that the head end section and the tail end section of the shroud are flared in bell mouth fashion.

Each mounting formation preferably includes a bearing element connected to an end section of the shaft, the bearing elements in use being mounted on an anchored support structure, such that the power generator assembly rotates relative to the support structure.

In a further variation, the power generator assembly includes a stator in front of the shroud, most preferably adjacent the shroud head end section. The stator preferably includes one or more blades of adjustable pitch.

In a yet variation, the power generator assembly includes a slotted ejector arrangement behind the shroud, most preferably adjacent the shroud tail end section. In one form, the slotted ejector arrangement is connected to, and rotates with, the shroud. In another form, the slotted ejector arrangement is not connected to, and does not rotate with, the shroud. In one embodiment, the slotted ejector arrangement includes a plurality of spaced apart tubular sections, and most preferably diverges diametrically away from the shroud. In another embodiment, the slotted ejector arrangement is of unitary construction, with a helical slot therein, and preferably diverges diametrically away from the shroud. In one form, the assembly preferably includes a drive means adapted to vary the axial length of the slotted ejector arrangement. In another form, the assembly preferably includes a drive means adapted to vary the axial length and radial width of the slotted ejector arrangement.

In another aspect, the present invention provides an electrical power generator assembly for using kinetic energy from a flowing fluid to generate power, the electrical power generator including:

a blade assembly having a head end for facing incoming flowing fluid, a tail end spaced from the head end for facing in the direction of the flowing fluid, and a rotational axis extending between the head end and the tail end, the blade assembly including a blade arrangement which includes a plurality of blades spaced along the length of the rotation axis, and at least one mounting formation connected to the blade arrangement, each mounting formation being adapted to permit mounting of the blade assembly for rotation about its rotational axis, so that in-use fluid flowing past the electrical power generator assembly interacts with the blade arrangement to rotate the blade assembly about its rotational axis; and at least one primary coil connected to the blade arrangement for rotation with the blade arrangement, the primary coil being arranged in use to interact with at least one stationary secondary coil to generate power in response to rotation of the blade assembly.

Preferably, the features or components of the electrical power generator according to this aspect of the invention, are similar to those of the electrical power generator according to the preceding aspect of the invention, when the blade arrangement of such power generator includes a plurality of blades.

In a further aspect, the present invention provides an electrical power generator installation, the installation including:

an electrical power generator as hereinbefore described including at least one secondary coil; and a support structure, the electrical power generator being mounted, by means of each mounting formation of the blade arrangement, on the support structure for rotation of the blade arrangement about its rotational axis, and each secondary coil of the power generator being mounted on the mounting structure.

In the case of tidal energy or ocean stream power generation, the power generator will be submerged in the ocean. In the case of river flow power generation, the power generator will be submerged in a river or flowing stream. In the case where the flowing fluid with which the power generator is associated is wind, the power generator will be located in an open area where it will be exposed to flow of air when the wind blows.

In one embodiment, the support structure includes a network of flexible elements, for example (heavy) chains or cables. The network of flexible elements may be arranged such that the generator can be aligned such that the inlet end of the shroud opposes the direction of flow of the fluid, preferably so that it aligns itself, in accordance with the direction of flow of a fluid. In this embodiment, the network of flexible elements can, preferably, be arranged such that the generator is mounted thereon in the general fashion of a windsock. In another embodiment, the support structure is a rigid structure including a network of rigid elements.

In another aspect, the present invention provides a propulsion or pump device adapted to eject a fluid, the propulsion or pump device including:

a blade assembly having a head end for facing incoming flowing fluid, a tail end spaced from the head end for facing in the direction of the flowing fluid, and a rotational axis extending between the head end and the tail end, the blade assembly including a blade arrangement which is arranged in generally helical fashion about the rotational axis, and at least one mounting formation connected to the blade arrangement, each mounting formation being adapted to permit mourning of the blade assembly for rotation about its rotational axis, so that in use rotation of the blade assembly about its rotational axis interacts with fluid flowing through the electrical power generator assembly; and at least one primary coil connected to the blade arrangement for rotation with the blade arrangement, said at least one primary coil being arranged in use to interact with at least one stationary secondary coil to generate rotation of the blade assembly in response to electrical power being applied to said at least one stationary secondary coil.

BRIEF DESCRIPTION OF THE DRAWINGS

Preferred embodiments of the present invention will now be described, by way of examples only, with reference to the accompanying drawings wherein.

DETAILED DESCRIPTION OF THE PREFERRED EMBODIMENTS

Figure 1:
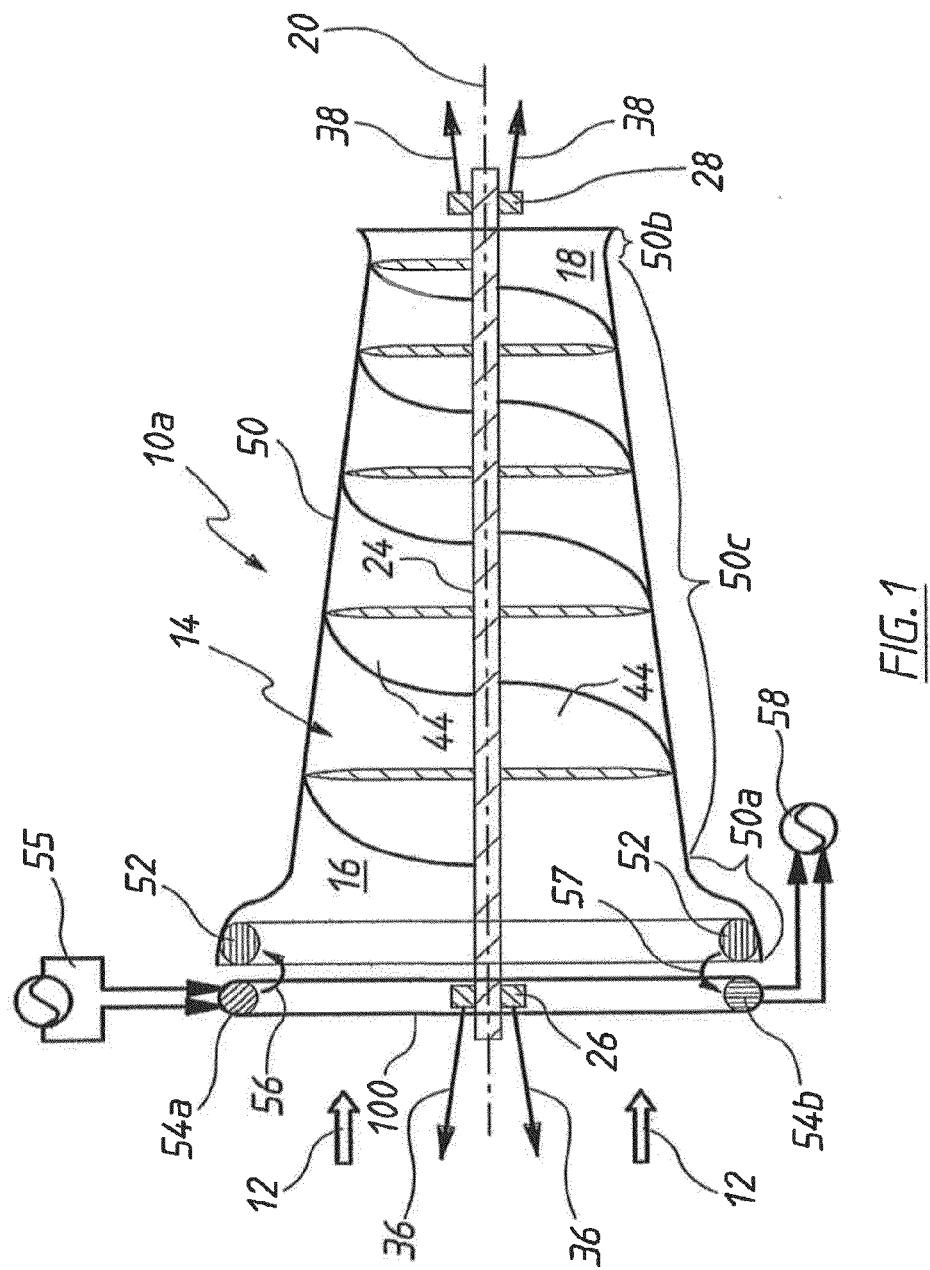
FIG. 1 is a schematic cross sectional view of a first embodiment of a power generator.

FIG. 1 shows schematically a first embodiment of an electrical power generator assembly 10a, which is driven by the kinetic energy of a flowing fluid 12, such as a tidal current, ocean stream, river flow or wind, to generate electrical power. The generator assembly 10a includes a blade assembly 14 with a head end 16 facing the oncoming flow of the fluid 12 and a tail end 18, spaced from the head end 16, which faces in the direction of the flow of the fluid 12.

The blade assembly 14 has a rotational axis 20 extending between the head end 16 and the tail end 18. The blade assembly 14 also includes a mounting formation in the form of a shaft 24 supported by head end bearings 26 and tail end bearings 28. Stay cables 36 and 38 are attached to the bearings 26 and 28 respectively, which locate the assembly 10a and resist movement of the assembly 10a in the fluid flow 12.

The blade assembly 14 also has a blade arrangement, in the form of a plurality, in this case, a pair, of equiangularly spaced helical blades 44, and a generally frusto-conical shroud 50. Other numbers of the equiangularly spaced helical blades (eg. 3, 4 or 5 etc can also be used. The blades 44 reduce in diameter as they wind around the shaft 24 from the head end 16 to the tail end 18 following the internal dimension of the shroud 50. The distal ends of the blades 44 are also bonded to the interior surface of the shroud 50. As a result, in use, the shroud 50 rotates with the blades 44, which creates a vortex in front of the shroud 50.

The shroud 50 is of multi section construction having a head end section 50a, via which the flowing fluid 12 enters the shroud 50, a tail end section 50b, via which the flowing fluid 12 exits the shroud 50, and an elongated intermediate section 50c extending between the head end section 50a and the tail end section 50b. The intermediate section 50c also converges in diameter from the head end section 50a towards the tail end section 50b. The head end section 50a of the shroud 50 also converges towards the intermediate section 50c and the tail end section 50b diverges away from the intermediate section 50c such that the shroud 50 is generally in the form of a converging-diverging venturi having a converging elongated throat defined by the intermediate section 50c. At all points along its length, the shroud 50 has a circular cross-sectional profile. The shroud head end section 50a, being shaped as a venturi, produces an area of low pressure behind the blade assembly 14 which advantageously results in a much freer flow of fluid through and exiting the shroud 50. Further, as the shroud 50 is bonded to the blades 44, the shroud 50 rotates in conjunction with the blades 44 and the rotational motion of the shroud 50 induces a swirl or vortex in front of the shroud 50. This vortex is advantageous as it models a whirlpool (as found in nature) and sucks additional fluid into the blade assembly 14 than would otherwise pass through it. The shroud 50 can also be of unitary moulded construction, for increased strength.

The assembly 10a also includes a stator 100.

A series of primary coils 52 are integrated into the shroud head end section 50a, by being wound around the extent of same. A series of secondary coils 54a and secondary power coils 54b are integrated into the stator 100.

In use, the blade assembly 14 is mounted within the fluid flow 12 which imparts its energy to the blades 44. As the fluid flow 12 applies a force to the blades 44, the blades 44 react by imparting a rotational force or torque to the shaft 24.

When a small excitation current 55 is applied to the secondary coils 54a, a magnetic field 56 is created which induces a current in the primary coils 52. The primary coils 52 then create a magnetic field 57 which, together with the rotational motion of the primary coils 52, induces a large current inside the secondary power coils 54b that is connected for electricity generation 58.

Alternatively, the primary coils 52 can be replaced with permanent magnets that create the magnetic field 57 and induce a current in the secondary power coils 54b for electricity generation 58. In this configuration, the secondary coils 54a and the excitation current 55 are not required.

Further alternatively, the excitation current 55 can be applied to the primary coil 52. In this configuration, the secondary coils 54a and the magnetic field 56 are not required.

The stay cables 36 and 38 are connected to a suitable support structure installed in the ocean or alternatively, they can be connected to a bridge or set of cables spanning an ocean inlet or a set of support structures.

Alternative arrangements of the bearings 26 and 28 and the stay cables 36 and 38 may be more suitable for other applications. For example, in another embodiment (not shown), the bearing 26 can be removed such that the bearing 28 is a single bearing to support both the axial and radial forces of the shaft 24. The stay cables 38 can also be removed such that the assembly 10a is supported by only the stay cables 36 and finds its own optimal alignment to flow much like a windsock does. The assembly 10a can also be neutrally buoyant and allowed to swing and change direction to operate on incoming and outgoing tides.

Further alternatively, a current of different frequency can be applied to the secondary coils 54a which in turn creates a magnetic field to induce a current in the primary coils 52. The induced current creates a magnetic field to interact with the magnetic field from the secondary coils 54a to produce rotational motion which in turn produces rotational motion of the blades 44 and provides thrust in the surrounding fluid to propel a craft or pump a fluid. The frequency of the current applied to the secondary coils 54a can be further adjusted so the assembly 10a acts as a regenerative brake which is useful for slowing or stopping the assembly 10a in adverse weather conditions.

Figure 2:
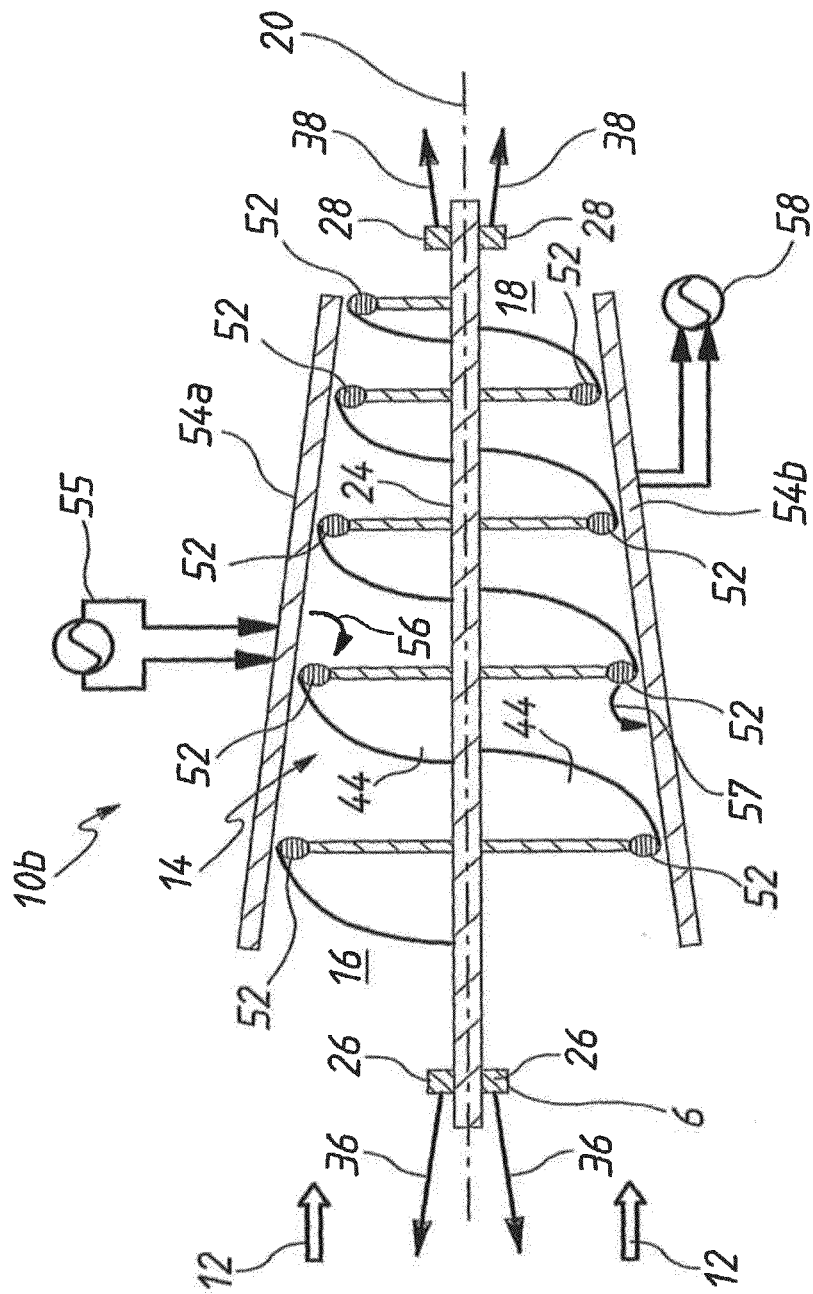
FIG. 2 is a schematic cross sectional view of a second embodiment of a power generator.

FIG. 2 shows a second embodiment of an electrical power generator assembly 10b. The assembly 10b is similar in construction and operation to that shown in FIG. 1 and like reference numerals to those used in the first embodiment shall be used to indicate like features in FIG. 2.

In the assembly 10b, the blade assembly 14 comprises a series of blades 44 arranged such that they create a helical profile around the shaft 24. The primary coils 52 are integrated into the blades 44 by being wound around the tips of the blades 44. The primary coils 52 are in magnetic communication with the secondary coils 54a and the secondary power coils 54b.

The fluid flow as depicted by the arrows 12 enters the assembly 10b and imparts its energy to the blades 44. As the fluid 12 applies a force to the blades 44, the blades 44 react by imparting a rotational force or torque to the shaft 24. The blades 44 can also be designed to direct the fluid 12 to flow radially inward towards the shaft 24 so that minimal fluid is allowed to escape the boundary of the assembly 10b, as defined by the secondary coils 54a and the secondary power coils 54b.

When the small excitation current 55 is applied to the secondary coils 54a, the magnetic field 56 is created which induces a current in the primary coils 52. The primary coils 52 then create the magnetic field 57 which, together with the rotational motion of the primary coils 52, induces a large current inside the secondary power coils 54b that is connected for electricity generation 58.

Figure 3:
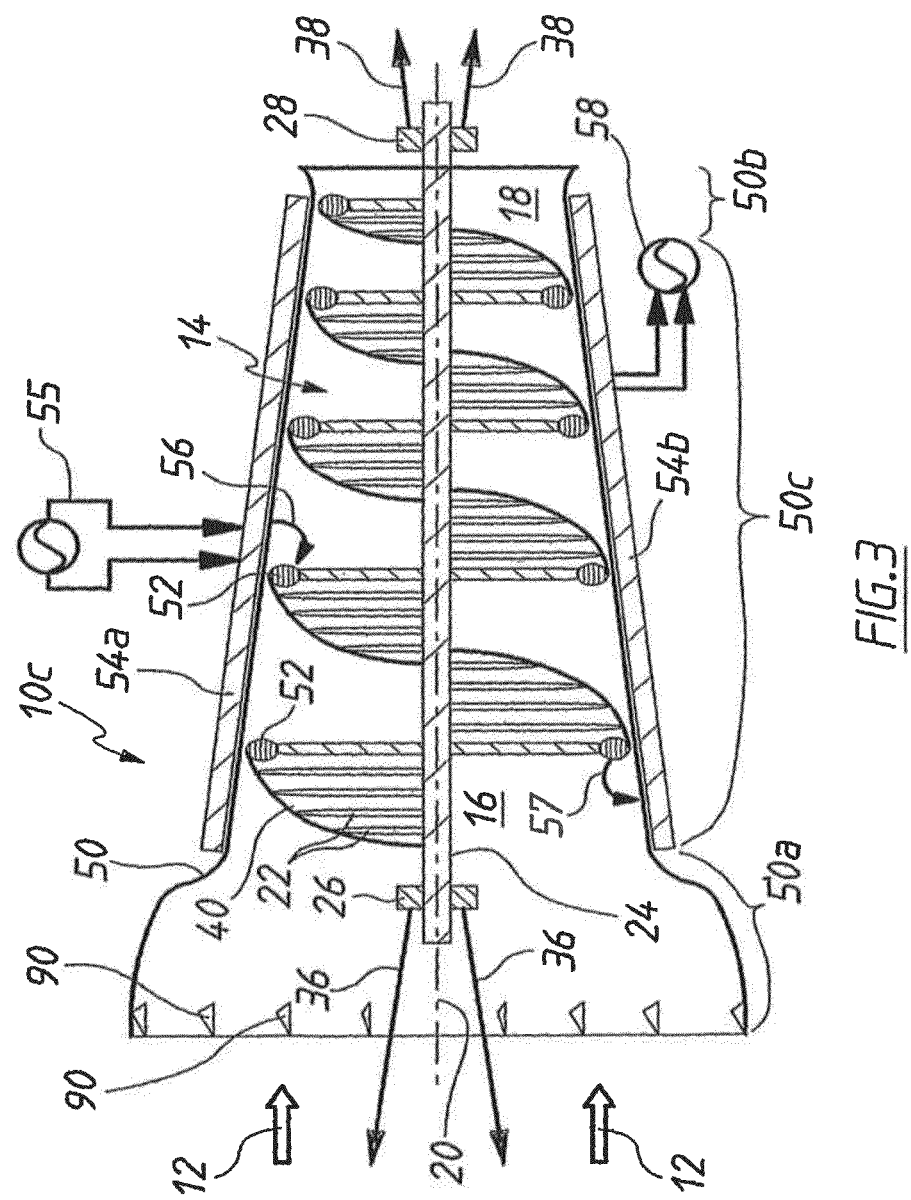
FIG. 3 is a schematic cross sectional view of a third embodiment of a power generator.

FIG. 3 shows a third embodiment of an electrical power generator assembly 10c. The assembly 10c is similar in construction and operation to those shown in FIGS. 1 and 2 and like reference numerals to those used in describing the first and second embodiments shall be used to indicate like features in FIG. 3.

In the assembly 10c, the blade assembly 14 has a blade arrangement, in the form of a series of independent beams 22 which are arranged in a generally helical fashion about the rotational axis 20.

The beams 22 are connected to the shaft 24 with sufficient clearance so they can rotated about the axis 20 with respect to each other. The beams 22 are held in place at the head end 16 of the shaft 24 via a flange (not shown) and, at the tail end 18, the shaft 24 is threaded and a nut (not shown) is tightened to apply force along the shaft 24 and lock the beams 22 in place. Optionally, a skin or web 40 can be wound around the beams 22, the skin 40 being able to expand and contract with the changing pitch of the beams 22.

The length of each of the beams 22 decreases as they wind around the shaft 24 from the head end 16 to the tail end 18 within the generally frusto-conical boundary defined by the intermediate section 50c of the shroud 50. The shroud is similar to that described with reference to assembly 10a in FIG. 1.

In use, the blade assembly 14 is mounted within the fluid flow 12 which imparts its energy to the skin 40 and beams 22. As the fluid flow 12 applies a force to the beams 22, the beams 22 react by imparting a rotational force or torque to the shaft 24.

The beams 22 can also be configured to direct the fluid flow 12 radially inwards towards the shaft 24 in order to minimise fluid escaping the boundary of the shroud 50. To do this, the beams 22, when viewed in the direction of the axis 20, are twisted and significantly curved inwards (in their direction of rotation) at their ends to act like 'cups' and direct the fluid flow towards the axis 20. As the fluid flow 12 continues to flow through the blade assembly 14, the cross sectional area of the flow decreases and its pressure decreases. As its pressure decreases, the velocity of fluid flow increases such that a maximum amount of energy is transferred from the fluid flow 12 to the beams 22. As a result, the generator assembly 10a behaves like a reaction turbine, which are normally associated with medium head flows rather than zero head free flows. As the velocity of the fluid flow 12 changes, the rotational alignment (ie. pitch) of the beams 22 can be altered in order to operate the generator assembly 10 at maximum efficiency or power output. This advantageously allows the turbine efficiency and power output to be significantly increased for a range of flow velocities.

The beams 22 include the primary coils 52 at their tips, similar to that described with reference to the assembly 10b in FIG. 2. The secondary coils 54a and the secondary power coils 54b are also similar to that described with reference to the assembly 10b in FIG. 2, and are positioned external the shroud 50.

The fluid flow 12 enters the assembly 10c and imparts its energy to the skin 40 and the beams 22. As the fluid 12 applies a force to the beams 22, the beams 22 react by imparting a rotational force or torque to the shaft 24.

When a small excitation current 55 is applied to the secondary coils 54a, the magnetic field 56 is created which induces a current in the primary coils 52. The primary coils 52 then create the magnetic field 57 which, together with the rotational motion of the primary coils 52, induces a large current inside the secondary power coils 54b that is connected for electricity generation 58.

In the assembly 10c, the shroud 50 also includes vanes 90 installed on the leading edge of the shroud head end section 50a in order to further increase the vortex induced in front of the shroud 50. This vortex is further aided by the increased velocity of the tips of the beams 22 at the entry of the head end 16 of the blade assembly 14 in creating suction pressure at the head end 16 of the shroud 50. The combination of decreased pressure inside the shroud 50; decreased pressure behind the shroud 50; the rotating shroud 50 inducing a vortex in front of the blade assembly 14; the flow vanes 90 inducing a vortex in front of the blade assembly 14; and the smaller pitch of the blades at the entry of the blade assembly 14 results in substantially more fluid being sucked into the blade assembly 14 than would otherwise occur. The increased fluid passing through the blade assembly 14 dramatically increases the power output of the assembly 10c.

Figure 4:
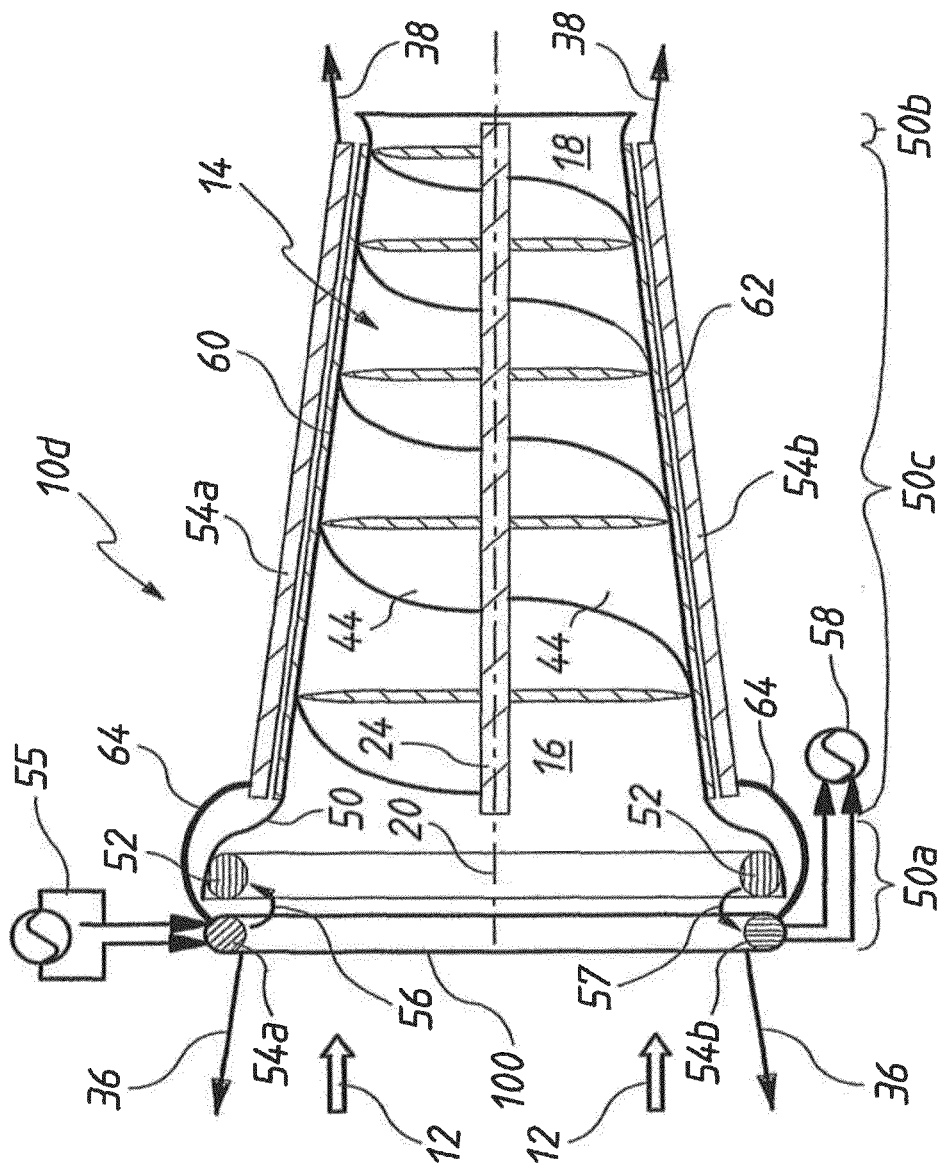
FIG. 4 is a schematic cross sectional view of a fourth embodiment of a power generator.

FIG. 4 shows a fourth embodiment of an electrical power generator assembly 10d. Once again, like features to those described with reference to earlier embodiments are denoted with like reference numerals.

In the assembly 10d, the blades 44 are similar to that described with reference to the assembly 10a in FIG. 1. The primary coils 52 are also integrated into the shroud head end section 50a, also similar to that described with reference to the assembly 10a in FIG. 1. The primary coils 52 are in magnetic communication with the secondary coils 54a and the secondary power coils 54b integrated into the stator 100. The shroud 50 rotates with the blades 44 and encompasses a half-set of magnetic bearings 60 that are in magnetic communication with an opposing half-set of magnetic bearings 62. The magnetic bearings 60 and 62 act as a set to repel each other so that they allow rotation of the shroud 50, the blades 44 and the primary coils 52. The tapered shape of the magnetic bearings 60 and 62 also allow them to act as a thrust bearing and apply a force along the axis of rotation 20 towards the head end 16 to react against the drag force applied to the blades 44. The magnetic bearings 60 and 62 are securely connected to the stator 100 by means of supports 64.

The fluid flow 12 enters the assembly 10*c* and imparts its energy to the blades 44. As the fluid 12 applies a force to the blades 44, the blades 44 react by imparting a rotational force or torque to the shaft 24.

When a small excitation current 55 is applied to the secondary coils 54*a*, the magnetic field 56 is created which induces a current in the primary coils 52. The primary coils 52 then create the magnetic field 57 which, together with the rotational motion of the primary coils 52, induces a large current inside the secondary power coils 54*b* that is connected for power generation 58.

The assembly 10*d* is held in a moving current by the stay cables 36 and 38. The stay cables 36 and 38 are connected to a suitable support structure installed in the ocean or alternatively, they could be connected to a bridge or set of cables spanning an ocean inlet or a set of support structures. Alternative arrangements of the stay cables 36 and 38 may be more suitable for other applications. For example, the exit stay cables 38 can also be removed such that the assembly 10*d* is supported by only the stay cables 36 and finds its own optimal alignment to flow much like a windsock does. The assembly 10*d* can also be neutrally buoyant and allowed to swing and change direction to operate on incoming and outgoing tides.

Figure 5:
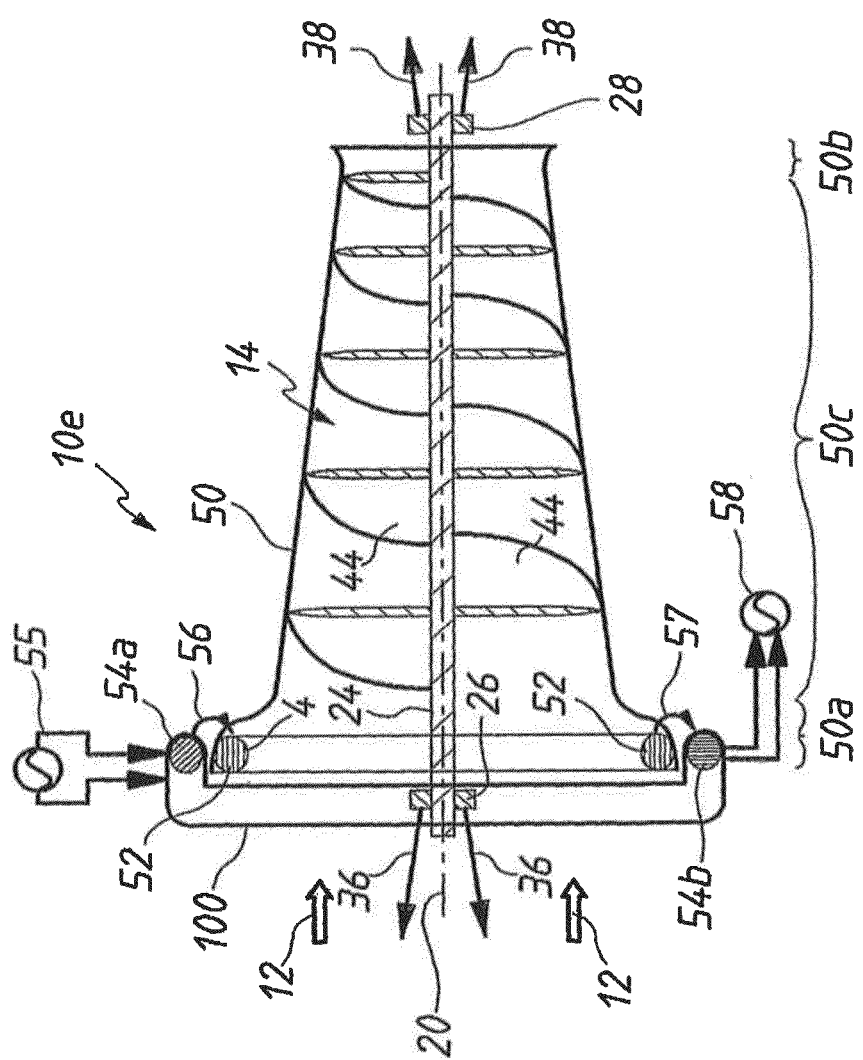
FIG. 5 is a schematic cross sectional view of a fifth embodiment of a power generator.

FIG. 5 shows a fifth embodiment of an electric power generator assembly 10*e*. Like features to those described with reference to earlier embodiments are again denoted with like reference numerals.

The assembly 10*e* is very similar in construction and operation to the assembly 10*a* described with reference to FIG. 1 except that the primary coils 52 and the secondary coils 54*a* and secondary power coils 54*b* are spaced radially apart rather than axially, with the secondary coils 54*a* and secondary power coils 54*b* on the outside of the primary coils 52. In this configuration, the assembly 10*d* behaves more like a ring generator, as opposed to a disc generator, and allows more space to integrate the coils. In an alternative arrangement, the secondary coils 54*a* and secondary power coils 54*b* are positioned on the inside of the primary coils 52.

Figure 6:
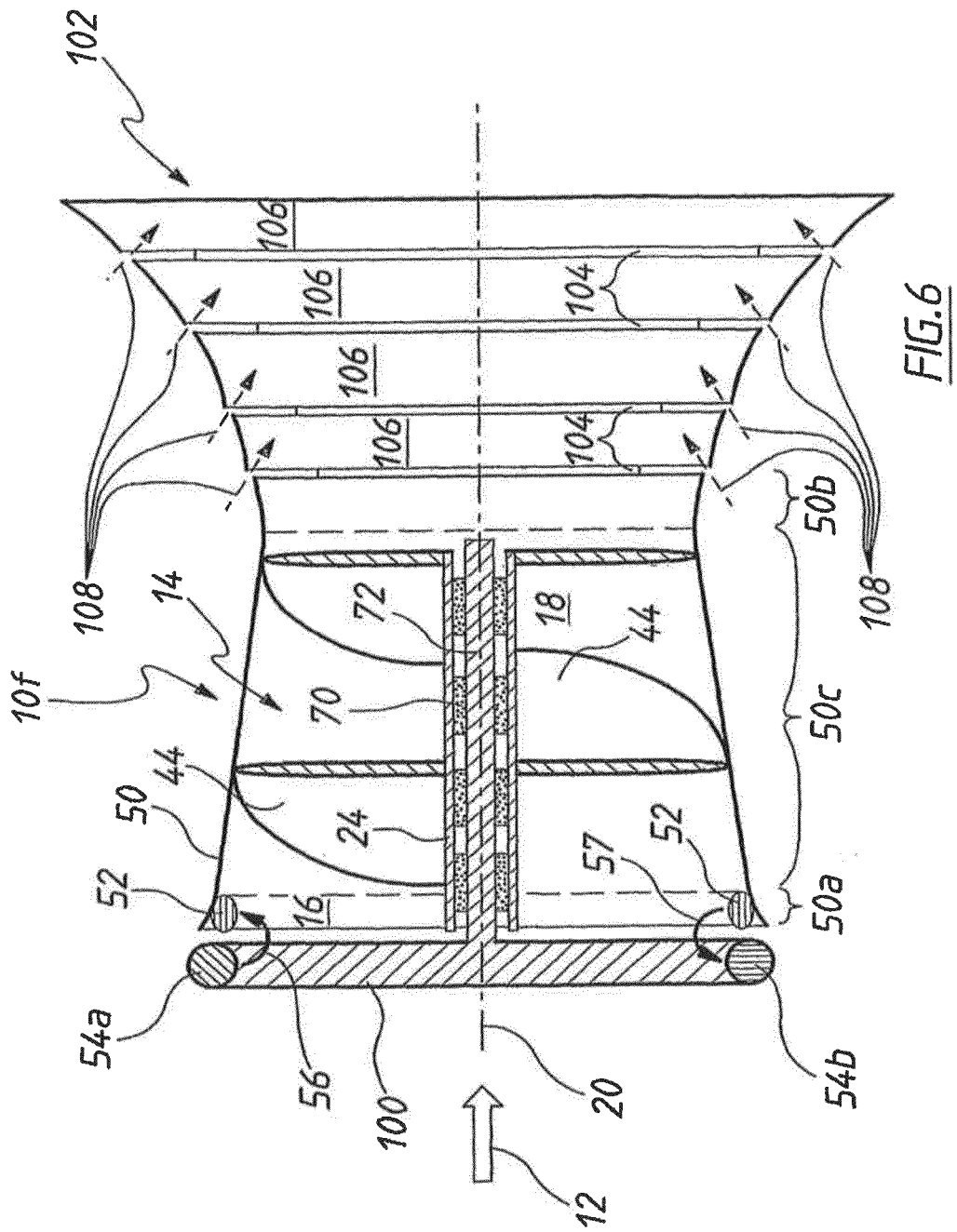
FIG. 6 is a schematic cross sectional view of a sixth embodiment of a power generator.

FIG. 6 shows a sixth embodiment of an electric power generator assembly 10*f*. Like features to those described with reference to earlier embodiments are again denoted with like reference numerals.

In the assembly 10*f*, the shaft 24 is hollow and includes therein tapered roller bearings 70 around a solid structural beam 72, which is bonded to the stator 100 (or other stationary structure). The bearings 70 allow the shaft 24 and the blades 44 to rotate relative to the beam 72 as well as to react to the axial thrust or drag forces on the assembly 10*f*. The blades 44 are similar to that described with reference to the assembly 10*a* in FIG. 1. The primary coils 52 are also integrated into the shroud head end section 50*a*, and the secondary coil 54*a* and the secondary power coil 54*b* are integrated into the stator, similar to that described with reference to the assembly 10*a* in FIG. 1.

The assembly 10*f* also includes a slotted ejector arrangement 102 at the exit (ie. tail end section 50*b*) of the shroud 50. The slotted ejector arrangement 102 is connected to the shroud 50 and thus rotates with the shroud 50. The gaps 104 between spaced apart sections 106 of the slotted ejector arrangement 102 allow fluid flowing around the exterior of the assembly 10*e* to effectively inject, as shown by arrows 108, into the fluid flow leaving the shroud. The effect of this additional fluid 108 is it induces a scavenging effect and increases the energy of the fluid leaving the shroud and causes more fluid to pass through the interior of the shroud 50, thereby improving the efficiency and power output of the assembly 10*e*.

The fluid flow as depicted by the arrows 12 enters the assembly 10*b* and imparts its energy to the blades 44. As the fluid 12 applies a force to the blades 44, the blades 44 react by imparting a rotational force or torque to the shaft 24.

When a small excitation current 55 is applied to the secondary coils 54*a*, a magnetic field 56 is created which induces a current in the primary coils 52. The primary coils 52 then create a magnetic field 57 which, together with the rotational motion of the primary coils 52, induces a large current inside the secondary power coils 54*b* that is connected for power generation 58.

Alternatively, the primary coils 52 can be replaced with permanent magnets that create the magnetic field 57 and induce a current in the secondary power coils 54*b* for electricity generation 58. In this configuration, the secondary coils 54*a* and the excitation current 55 are not required.

The stay cables 36 and 38 are connected to a suitable support structure installed in the ocean or alternatively, they can be connected to a bridge or set of cables spanning an ocean inlet or a set of support structures. Alternative arrangements of the stay cables 36 and 38 may be more suitable for other applications. For example, the exit stay cables 38 can also be removed such that the assembly 10*f* is supported by only the stay cables 36 and finds its own optimal alignment to flow much like a windsock does. The assembly 10*d* can also be neutrally buoyant and allowed to swing and change direction to operate on incoming and outgoing tides.

Alternatively a current of different frequency can be applied to the secondary power coils 54*b* which in turn creates a magnetic field to induce a current in the primary coils 52. The induced current creates a magnetic field to interact with the magnetic field from the secondary coils 54*a* to produce rotational motion which in turn produces rotational motion of the blades 44 and provides thrust in the fluid 12 to propel a craft or pump a fluid. The frequency of the current applied to the secondary power coils 54*b* can be further adjusted so the turbine acts as a regenerative brake which is useful for slowing or stopping the turbine in adverse weather conditions.

Figure 7:
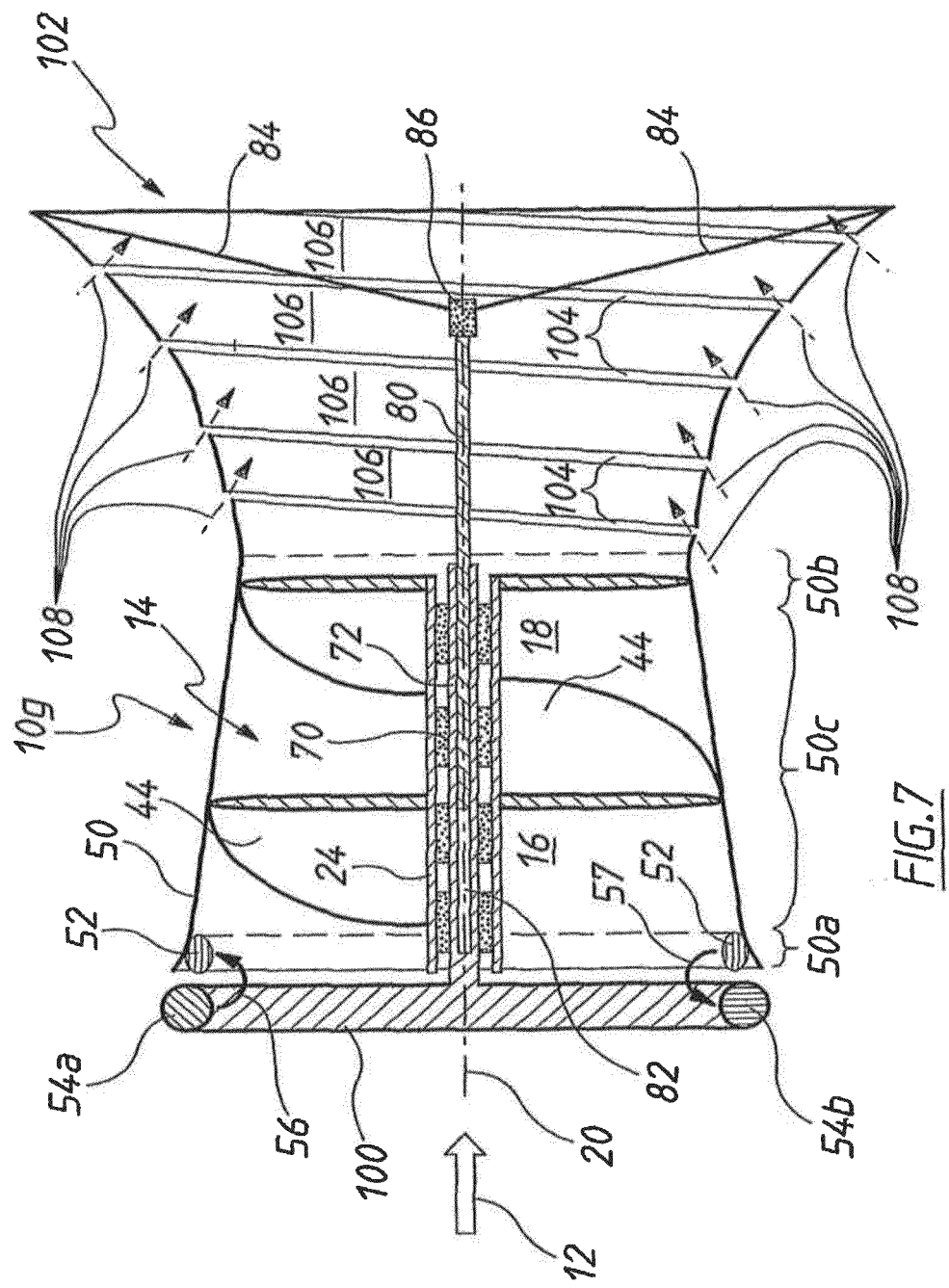
FIG. 7 is a schematic cross sectional view of a seventh embodiment of a power generator.

FIG. 7 shows a seventh embodiment of an electric power generator assembly 10*g*. Like features to those described with reference to earlier embodiments are again denoted with like reference numerals. The assembly 10*g* is similar in construction and operation to the assembly 10*f* described with reference to FIG. 6.

The slotted ejector arrangement 102 is connected to the shroud 50 and thus rotates with the shroud 50. However, in the assembly 10*f*, the slotted ejector arrangement 102 is of unitary construction with a single helical slot forming the gaps 104 between the sections 106. It should be noted that the length of the slotted ejector 102 can be adjusted to change the width of the slots 104 to vary the effect of injection and power output. By changing the length of the ejector, the width of the slots 22 can be altered and the power output adjusted. A drive device, in the form of a hydraulic ram 80 is connected to the structural beam 72. The drive device can alternatively be a worm gear arrangement. A hydraulic cylinder 82 is connected to one end of the ram 80 and used to extend or contract the ram 80. The other end of the ram 80 is connected to the most outwardly ejector ring 108, via supports 84 and a pivot 86. As the ram 80 extends, it applies a force on the pivot 86, the supports 84 and the (end) ring 108, such that the ejector arrangement 102 increases in length (and reduces in diameter). To contract (and widen) the ejector arrangement 102, a reverse force is applied using the ram 80.

For example, the assembly 10*f* can be installed with a longer slotted ejector arrangement 102 in slow flows to draw more water through and increase power output. In fast currents, a shorter slotted ejector arrangement 102 can be utilised. The helical slotted ejector arrangement 102 can also be constructed from an elastic material such as aluminium so it can vary its shape depending on the force applied to it from the strength of the water flow.

Figure 8:
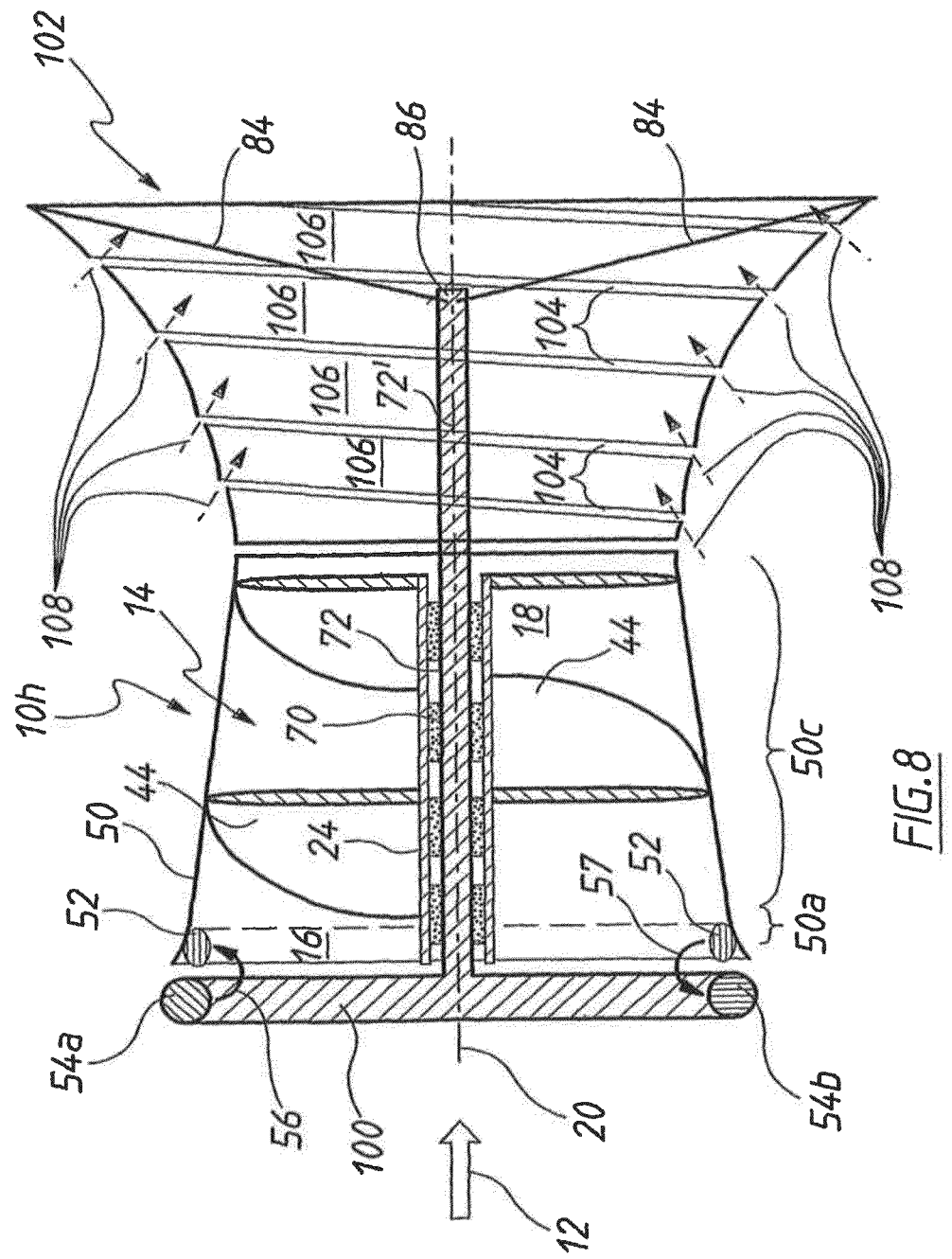
FIG. 8 is a schematic cross sectional view of an eighth sixth embodiment of a power generator.

FIG. 8 shows an eighth embodiment of an electric power generator assembly 10*h*. Like features to those described with reference to earlier embodiments are again denoted with like reference numerals. The assembly 10*g* is similar in construction and operation to the assembly 10*g* described with reference to FIG. 7.

However, in the assembly 10*h*, the slotted ejector arrangement 102 is not connected to the shroud 50 and does not rotate with the shroud 50. The slotted ejector arrangement 102 is instead connected to an extension 72' of the structural beam 72 via the supports 84 and thus remains stationary whilst the shroud 50 rotates.

Figure 9:
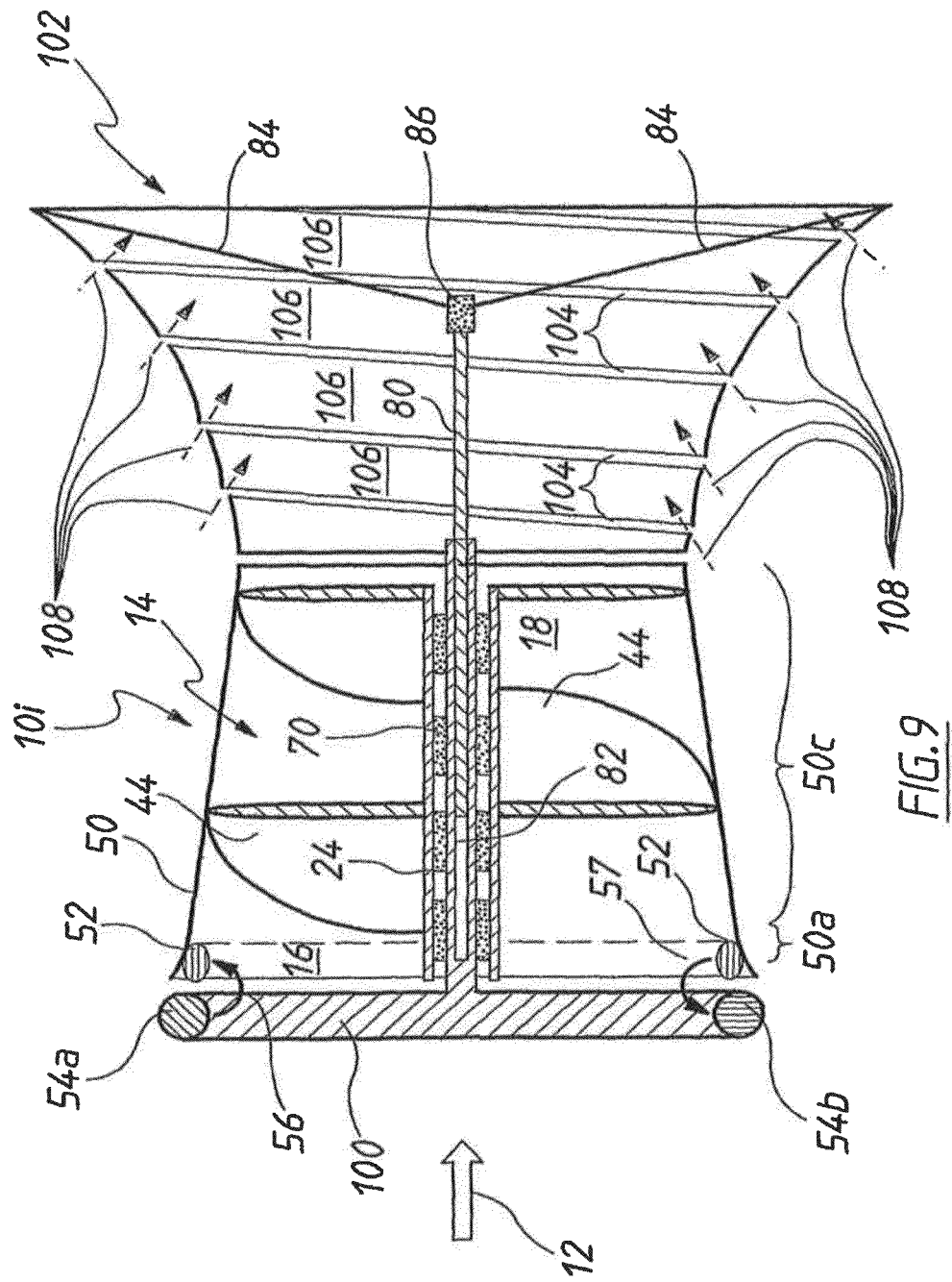
FIG. 9 is a schematic cross sectional view of a ninth embodiment of a power generator.

FIG. 9 shows a ninth embodiment of an electric power generator assembly 10*i*. Like features to those described with reference to earlier embodiments are again denoted with like reference numerals. The assembly 10*i* is similar in construction and operation to the assembly 10*g* described with reference to FIG. 7.

However, in the assembly 10*i*, the slotted ejector arrangement 102 is again not connected to the shroud 50 and does not rotate with the shroud 50. Further, the ram 80 does not rotate relative to the structural beam 72. The slotted ejector arrangement 102 is instead connected to the structural beam 72 via the supports 84 and the pivot 86 and thus remains stationary whilst the shroud 50 rotates.

The hydraulic cylinder 82 connected to one end of the ram 80 can be used to extend or contract the ram 80. As the ram 80 extends, it applies a force on the pivot 86, the supports 84 and the (end) ring 106, such that the ejector arrangement 102 increases in length (and narrows in diameter). To contract (and widen) the ejector arrangement 102, a reverse force is applied using the ram 80. Further, if the pivot 86 is replaced with a fixed connector, then extending the ram 80 only increases the length of the ejector arrangement. Similarly, a reverse force on the ram 80 only contracts the ejector arrangement 102.

Although the invention has been described with reference to preferred embodiments, it would be appreciated by persons skilled in the art that the invention may be embodied in many other forms.

The invention claimed is:

1. An electrical power generator assembly for using kinetic energy from a flowing fluid to generate electrical power, the electrical power generator assembly including:
    a blade assembly having a head end for facing incoming flowing fluid, a tail end spaced from the head end for facing in the direction of the flowing fluid, and a rotational axis extending between the head end and the tail end, the blade assembly including a blade arrangement which is arranged in a generally helical fashion about the rotational axis, and at least one mounting formation connected to the blade arrangement, the at least one mounting formation being adapted to permit rotation of the blade assembly about the rotational axis when the flowing fluid interacts with the blade arrangement to rotate the blade assembly;
    at least one primary coil connected to the blade arrangement for rotation with the blade arrangement, the at least one primary coil being energizable and being arranged to interact with at least one stationary secondary coil to generate electrical power in response to rotation of the blade assembly;
    an elongated open-ended shroud extending between the head end and the tail end, the shroud having a head end section through which the flowing fluid can enter the shroud, a tail end section through which the flowing fluid can exit the shroud, and an elongated intermediate section extending between the head end section and the tail end section, the shroud being connected to and surrounding the blade assembly so that the shroud rotates with the blade assembly; and
    a stator disposed adjacent the shroud,
    wherein the at least one primary coil is integrated into the head end section of the shroud and the at least one stationary secondary coil is integrated into the stator.

2. The power generator assembly as claimed in claim 1, wherein the electrical power generator includes a plurality of primary coils, each primary coil being connected to one of the blades at or adjacent the tip of the blade.

3. The power generator assembly as claimed in claim 1, wherein the electrical power includes a current supply electrically connected to the at least one primary coil for energizing the at least one primary coil in order to induce a magnetic field around the at least one primary coil.

4. The power generator as claimed in claim 1, wherein the electrical power generator assembly also includes a current supply electrically connected to the at least one secondary coil for energizing the at least one secondary coil in order to induce a magnetic field which induces a current in the at least one primary coil.

5. The power generator assembly as claimed in claim 1, wherein the electrical power generator includes a plurality of said secondary coils.

6. The power generator assembly as claimed in claim 1, wherein the blade assembly includes an elongated shaft extending between the head end and the tail end, the shaft having a longitudinal axis aligned with the rotational axis of the blade assembly, and the blade arrangement being mounted on and radiating from the shaft.

7. The power generator assembly as claimed in claim 6, wherein the blade arrangement terminates shy of the ends of the shaft, and wherein the at least one mounting formation is provided on an end portion of the shaft, and wherein the shaft and the blade assembly are rotatably mounted or supported by the at least one mounting formation.

8. The power generator assembly as claimed in claim 6, wherein each mounting formation includes a bearing element mounted on the shaft and adapted to be connected to a support structure to permit rotation of the blade assembly relative to said support structure.

9. The power generator assembly as claimed in claim 1, wherein the blade arrangement includes a plurality of beams which are longitudinally spaced in said generally helical fashion along the shaft.

10. The power generator assembly as claimed in claim 9, wherein each beam is mounted on the shaft such that it is adjustably rotatable around the rotational axis of the shaft, to permit adjustment of the pitch of the blade assembly.

11. The power generator assembly as claimed in claim 9, wherein the blade arrangement further includes a web or skin extending along the lengths of and connected to each pair of adjacent beams, such that the blade arrangement, irrespective of the pitch of each beam is uninterrupted across its surface.

12. The power generator assembly as claimed in claim 1, wherein the blade arrangement includes one or more continuous helical blades.

13. The power generator assembly as claimed in claim 1, wherein the blade arrangement, when seen in side elevation, tapers from the head end thereof to its tail end.

14. The power generator assembly as claimed in claim 1, wherein the shroud is connected to a tip of each blade of the blade arrangement, the connection between the shroud and the tip of each blade being substantially impervious to fluid.

15. The power generator assembly as claimed in claim 1, wherein the blade arrangement includes a plurality of beams and said webs or skins, a tip of each web or skin is also connected to the shroud.

16. The power generator assembly as claimed in claim 1, wherein the connections between the webs or skins and the shroud are substantially fluid impervious connections.

17. The power generator assembly as claimed in claim 1, wherein the shroud is of thin wall construction, and converges along at least part of its length from the head end section to the tail end section, the convergence corresponding to the tapering of the blade assembly.

18. The power generator assembly as claimed in claim 1, wherein the shroud is of multi-section or unitary moulded construction.

19. The power generator assembly as claimed in claim 18, wherein the shroud has a circular cross-sectional profile, so that the head end section and the tail end section of the shroud are flared in bell mouth fashion.

20. The power generator assembly as claimed in claim 1, wherein the head end section of the shroud converges towards the intermediate section, and the tail end section diverges away from the intermediate section, such that the shroud is generally in the form of a converging-diverging venturi having a converging elongated throat defined by the intermediate section.

21. The power generator assembly as claimed in claim 1, wherein the power generator assembly includes a slotted ejector arrangement behind the shroud.

22. The power generator assembly as claimed in claim 21, wherein the slotted ejector arrangement is adjacent the shroud tail end section.

23. The power generator assembly as claimed in claim 21, wherein the slotted ejector arrangement is connected to, and rotates with, the shroud.

24. The power generator assembly as claimed in claim 21, wherein the slotted ejector arrangement is not connected to, and does not rotate with, the shroud.

25. The power generator assembly as claimed in claim 21, wherein the slotted ejector arrangement includes a plurality of spaced apart tubular sections.

26. The power generator assembly as claimed in claim 25, wherein the slotted ejector arrangement diverges diametrically away from the shroud.

27. The power generator assembly as claimed in claim 21, wherein the slotted ejector arrangement is of unitary construction, with a helical slot therein.

28. The power generator assembly as claimed in claim 27, wherein the assembly includes a drive means adapted to vary the axial length of the slotted ejector arrangement.

29. The power generator assembly as claimed in claim 27, wherein the assembly includes a drive means adapted to vary the axial length and radial width of the slotted ejector arrangement.

30. The power generator assembly as claimed in claim 1, wherein the intermediate section of the shroud converges from the head end section towards the tail end section.

31. The power generator assembly as claimed in claim 1, wherein the at least one mounting formation includes a bearing element connected to an end section of the shaft, the bearing element being mounted on an anchored support structure to rotate the power generator assembly relative to the support structure.

32. An electrical power generator assembly for using kinetic energy from a flowing fluid to generate electrical power, the electrical power generator assembly including:
a blade assembly having a head end for facing incoming flowing fluid, a tail end spaced from the head end for facing in the direction of the flowing fluid, and a rotational axis extending between the head end and the tail end, the blade assembly including a blade arrangement which is arranged in a generally helical fashion about the rotational axis, the blade assembly including an elongated open-ended shroud extending between the head end and the tail end of the blade assembly, the shroud having a head end section through which the flowing fluid can enter the shroud, a tail end section through which the flowing fluid can exit the shroud, and an elongated intermediate section extending between the head end section and the tail end section, the shroud being connected to and surrounding the blade arrangement so that the shroud rotates with the blade arrangement;
at least one mounting formation connected to the blade arrangement, the at least one mounting formation being adapted to permit rotation of the blade assembly about the rotational axis when the flowing fluid interacts with the blade arrangement to rotate the blade assembly;
at least one permanent magnet connected to the blade arrangement for rotation with the blade arrangement, the at least one permanent magnet being arranged to interact with at least one stationary secondary coil to generate electrical power in response to rotation of the blade assembly; and
a stator disposed adjacent the shroud,
wherein the at least one permanent magnet is integrated into the head end section of the shroud and the at least one stationary secondary coil is integrated into the stator.

33. An electrical power generator assembly for using kinetic energy from a flowing fluid to generate power, the electrical power generator assembly including:
a blade assembly having a head end for facing incoming flowing fluid, a tail end spaced from the head end for facing in the direction of the flowing fluid, and a rotational axis extending between the head end and the tail end, the blade assembly including a blade arrangement which includes a plurality of blades spaced along the length of the rotational axis, and at least one mounting formation connected to the blade arrangement, the at least one mounting formation being adapted to permit rotation of the blade assembly about the rotational axis when the flowing fluid interacts with the blade arrangement to rotate the blade assembly;
at least one primary coil connected to the blade arrangement for rotation with the blade arrangement, the primary coil being arranged to interact with at least one stationary secondary coil to generate power in response to rotation of the blade assembly;
an elongated open-ended shroud extending between the head end and the tail end of the blade assembly, the shroud having a head end section through which the flowing fluid can enter the shroud, a tail end section through which the flowing fluid can exit the shroud, and an elongated intermediate section extending between the head end section and the tail end section, the shroud being connected to and surrounding the blade assembly so that the shroud rotates with the blade assembly; and
a stator disposed adjacent to the shroud,
wherein the at least one primary coil is integrated into the shroud head end section and the at least one stationary secondary coil is integrated into the stator.

* * * * *

UNITED STATES PATENT AND TRADEMARK OFFICE
CERTIFICATE OF CORRECTION

| | |
|---|---|
| PATENT NO. | : 8,853,873 B2 |
| APPLICATION NO. | : 13/973100 |
| DATED | : October 7, 2014 |
| INVENTOR(S) | : Michael John Urch |

Page 1 of 1

It is certified that error appears in the above-identified patent and that said Letters Patent is hereby corrected as shown below:

Under item (63), "Related U.S. Application Data" on the title page, "application No. PCT/AU2008/001704 on Nov. 4, 2008" should read --application No. PCT/AU2008/001704 on Nov. 14, 2008--.

Signed and Sealed this
Sixth Day of January, 2015

Michelle K. Lee
*Deputy Director of the United States Patent and Trademark Office*